United States Patent [19]
Ban et al.

[11] 4,241,820
[45] Dec. 30, 1980

[54] CLUTCH ASSEMBLY

[75] Inventors: Hiroshi Ban, Toyota; Tadamasa Kobayashi, Okazaki; Syozo Kuno, Toyota, all of Japan

[73] Assignee: Aisin Seiki Kabushiki Kaisha, Kariya, Japan

[21] Appl. No.: 946,918

[22] Filed: Sep. 28, 1978

[30] Foreign Application Priority Data

Oct. 6, 1977 [JP] Japan ................................. 52-134559

[51] Int. Cl.³ ............................................. F16D 13/71
[52] U.S. Cl. ................................................. 192/89 B
[58] Field of Search ............... 192/89 B, 89 A, 89 QT, 192/89 R

[56] References Cited
U.S. PATENT DOCUMENTS

| | | | |
|---|---|---|---|
| 3,300,007 | 1/1967 | Motsch | 192/89 B |
| 3,489,256 | 1/1970 | Binder et al. | 192/89 B |

*Primary Examiner*—George H. Krizmanich
*Attorney, Agent, or Firm*—Sughrue, Rothwell, Mion, Zinn & Macpeak

[57] ABSTRACT

A clutch assembly has a clutch cover secured to a flywheel, a diaphragm spring positioned outside the clutch cover, and an annular pressure plate positioned inside the clutch cover. The diaphragm spring is pivotally mounted on the clutch cover by rivets disposed in several openings formed in the diaphragm spring. The pressure plate is connected with the clutch cover by a suitable number of flexible drive straps which are disposed between the clutch cover and the pressure plate and extend chordally across the pressure plate. One end of each drive strap is secured to the pressure plate by a rivet. The other end of each drive strap is secured to the clutch cover by a rivet which is positioned radially inwardly of the inner periphery of the pressure plate and is aligned with an opening formed in the diaphragm spring. The rivet for securing each drive strap to the clutch cover may be riveted under the condition wherein one end of the drive strap is already secured to the pressure plate and the diaphragm spring is already secured to the cover plate.

4 Claims, 3 Drawing Figures

CLUTCH ASSEMBLY

BACKGROUND OF THE INVENTION

1. Field of the Invention

This invention generally relates to a clutch assembly and more specifically to a clutch assembly for use with automotive vehicles and the like.

2. Description of the Prior Art

British Patent Specification No. 1,121,320 discloses a clutch assembly for use with automotive vehicles and the like and comprises a clutch cover secured to a flywheel, an annular pressure plate positioned inside the clutch cover and connected thereto through flexible drive straps and a diaphragm spring positioned outside the clutch cover and pivotally mounted on the clutch cover by mounting means. The diaphragm spring includes an outer annular spring portion engagable with abutments on the pressure plate and a central portion radially inwardly of the mounting means. The mounting means serves as a fulcrum for movement of the diaphragm spring. The diaphragm spring normally urges the pressure plate toward the flywheel so as to engage the clutch. When the driver of the vehicle depresses the clutch pedal the inner portion of the diaphragm spring is moved toward the flywheel by the thrust means operatively connected to the clutch pedal against the resilient force of the diaphragm spring and the outer portion of the diaphragm spring moves away from the pressure plate so as to disengage the clutch. Therefore, it is desirable that the mounting means for the diaphragm spring are positioned radially outwardly as far as possible to reduce the operational force of the clutch pedal. In order to satisfy this desire, the mounting means for the diaphragm spring are generally positioned radially outwardly of the inner periphery of the pressure plate.

It is also desirable that the end of each drive strap to be secured to the pressure plate be positioned radially inwardly of the outer periphery of the pressure plate to reduce the diameter of the clutch. In the case where one end of each drive strap is positioned radially outwardly of the outer periphery of the pressure plate, the pressure plate is provided with a portion to be connected to one end of each drive strap at the outer periphery thereof, thereby causing an increase in the diameter of the clutch. This latter situation is true in the British Patent Specification No. 1,121,320 as well as U.S. Pat. No. 2,770,341.

In a conventional clutch assembly of this type, if the mounting means for the diaphragm spring include pivot rivets and both ends of each drive strap are secured by securing rivets to the pressure plate and the clutch cover respectively, it is impossible to assemble the clutch cover, pressure plate and the diaphragm spring as a unit because the pressure plate connected to the clutch cover obstructs the riveting of the pivot rivets and the diaphragm spring mounted on the clutch cover also obstructs the riveting of one of the securing rivets. Therefore, in order to assemble the clutch cover, pressure plate and the diaphragm spring as a unit, it is necessary to use bolt means which will mount the diaphragm spring on the clutch cover or secure either one end of the drive strap to the pressure plate or the clutch cover. However, the bolt means require a longer time to be attached than rivets and require additional means for preventing the loosening thereof thereby causing poor efficiency in the assembly time of the clutch.

Therefore, in order to obtain greater efficiency in assembly time for the clutch and reduce the production cost of the clutch, it is desirable that the mounting means for mounting the diaphragm spring on the clutch cover include pivot rivets and both ends of the drive straps are secured to the pressure plate and clutch cover by securing rivets.

SUMMARY OF THE INVENTION

Accordingly, a primary object of the present invention is to provide a clutch assembly which satisfies the above-described desire.

Another object of the present invention is to provide a clutch assembly which improves the efficiency in assembly time thereof.

A further object of the present invention is to provide a clutch assembly wherein the diaphragm spring is mounted on the clutch cover by mounting means including pivot rivets and both ends of the drive straps are secured by securing rivets to the clutch cover and the pressure plate respectively.

The foregoing and other objects, features and advantages of the present invention will become apparent from the following description taken in connection with the accompanying drawings.

DETAILED DESCRIPTION OF THE INVENTION

Figure 1:
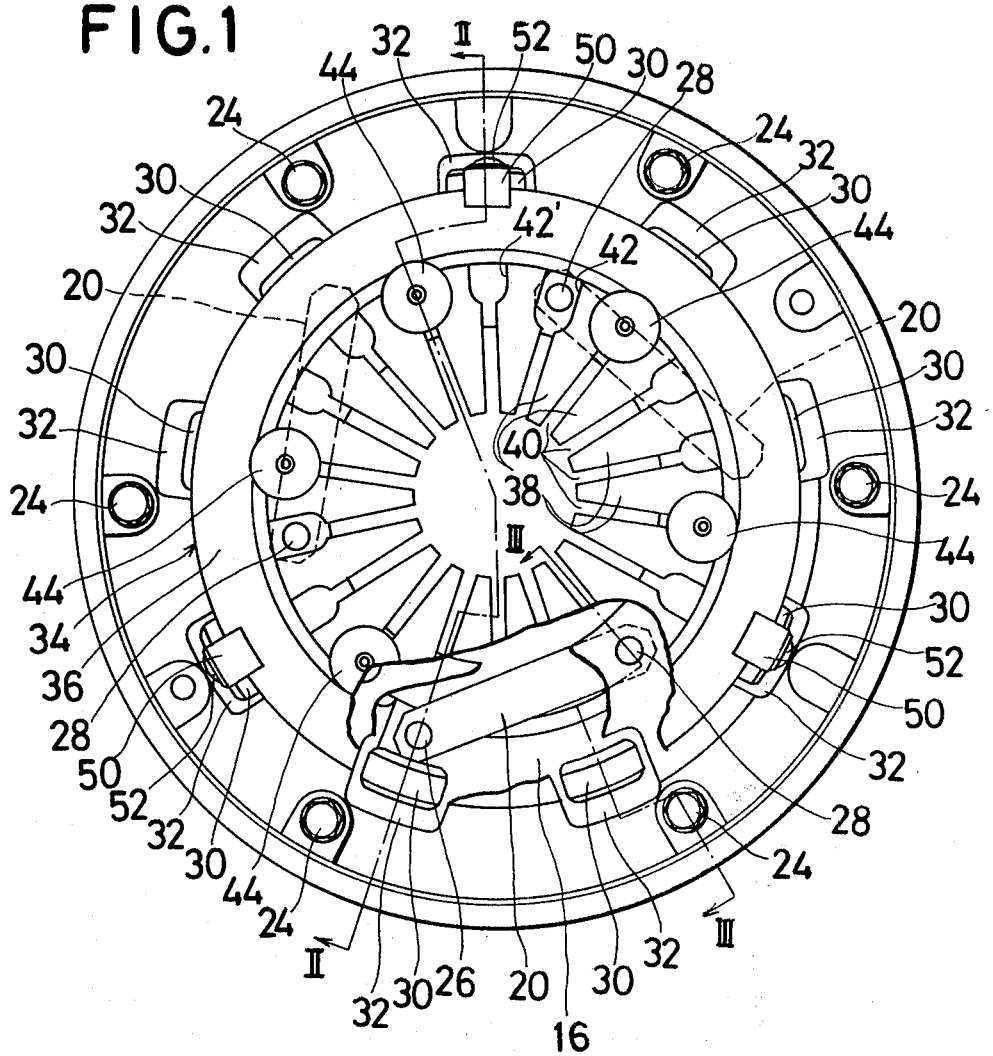
FIG. 1 is a front elevation view of a clutch assembly in accordance with the present invention with portions thereof broken away to show one of the drive straps.
Figure 2:
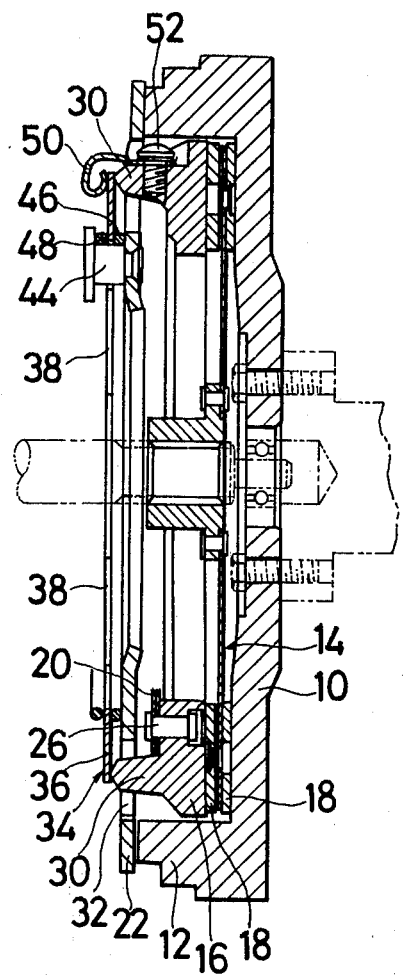
FIG. 2 is a cross-sectional view taken along the line II—II in FIG. 1.
Figure 3:
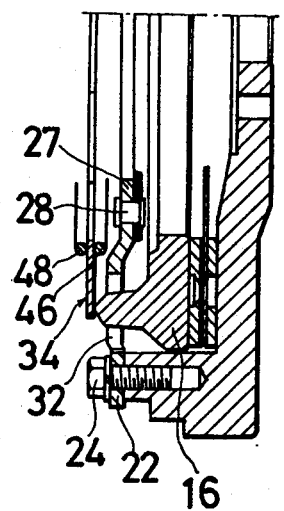
FIG. 3 is a cross-sectional view taken along the line III—III of FIG. 1.

The clutch assembly is comprised of a flywheel 10 which is secured to a drive shaft which may be an engine crank shaft (not shown). The flywheel 10 is provided with an axially extending rim 12 forming a cylindrical recess for receiving the driven disc 14 and an annular pressure plate 16. The driven disc 14 is slidably splined on a driven shaft which may be a transmission input shaft (not shown) and is provided with friction facings 18 on opposite sides thereof. The pressure plate 16 is connected by a suitable number of flexible drive straps 20 to a clutch cover 22 which is secured at the outer peripheral portion thereof to the end of the rim 12 of the flywheel 10 by bolts 24. One end of each drive strap 20 is secured to the inner surface of an axially inwardly drawn seat portion 27 of the clutch cover 22 by a securing rivet 28 passing through a hole formed in the clutch cover 22. The other end of each drive strap 20 is secured to the inner peripheral portion on the back surface of the pressure plate 16 by a securing rivet 26 passing through a hole formed in the pressure plate 16. The drive straps 20 extend chordally across the pressure plate 16 and allow relative axial movement between the flywheel 10 and the pressure plate 16. The pressure plate 16 is provided with axially extending projections 30 on the back surface thereof. The projections 30 are positioned radially outwardly of the straps 20 and pass through openings 32 formed in the clutch cover 22. A diaphragm spring 34 disposed axially outside the clutch cover 22 includes an annular spring portion 36 and release fingers 38 which extend radially inwardly from the annular spring portion 36. Between each of the release fingers 38 a slot 40 is cut in the original annular section forming the annular spring portion 36 and openings 42' are provided at the radially outer ends of the slots 40 to accept pivot rivets 44 which secure the diaphragm spring 34 to the clutch cover 22. Pivot rings 46 and 48 are disposed on the axially inner and outer side respectively of the diaphragm spring 34 and around the pivot rivets 44 to serve as a fulcrum for movement of the diaphragm spring 34. The outer peripheral portion of the annular spring portion 36 of the diaphragm spring 34 contacts the ends of the projections 30 on the pressure plate 16. The diaphragm spring 34 normally urges the pressure plate 16 toward the flywheel 10 so that the pressure plate 16 normally holds the driven disc 14 in engagement with the flywheel 10 for transmitting the flywheel drive to the driven shaft. Spring clips 50 are secured to the pressure plate 16 by screws 52 and are adapted to retain the outer periphery of the diaphragm spring 34 against the projections 30 so that the pressure plate 16 is adapted to be moved in conformity with movement of the outer periphery of the diaphragm spring. When the inner ends of the fingers 38 of the diaphragm spring 34 are moved toward the flywheel 10 by conventional thrust means (not shown), the outer periphery of the diaphragm spring moves away from the flywheel 10 so that the pressure plate 16 disengages from the driven disc 14 and the driven disc in turn disengages from the flywheel 10. When the pressure plate 16, clutch cover 22 and diaphragm spring 34 are assembled as a unit, the pressure plate 16 may be connected to the clutch cover 22 after the diaphragm spring 34 is secured to the clutch cover 22 by pivot rivets 44 and one end of each drive strap 20 may be secured to the clutch cover 22 after the other end of each drive strap 20 is secured to the pressure plate 16 by securing rivets 26 so that the pivot rivets 44 and securing rivets 26 may be riveted without any obstacle. In order to rivet the securing rivets 28 under such conditions wherein the pressure plate 16 having the drive straps 20 secured thereto is fitted to the clutch cover 22 which has the diaphragm spring 34 secured thereto, the securing rivets 28 are positioned radially inwardly of the inner periphery of the pressure plate 16 and are aligned with selected openings 42 formed in the diaphragm spring 34. This arrangement allows the inner ends of the securing rivets 28 to be received by suitable tools and the outer ends of the securing rivets 28 to be riveted by rivet-tools passed through selected openings 42 of the diaphragm spring 34. It is noted that the selected openings 42 are formed large enough to allow the passing of the rivet-tool but the remaining openings 42' are not necessarily formed in the same manner as the selected openings 42. The inner ends of the remaining openings 42' may be positioned radially outwardly further than the inner ends of the selected openings 42 as shown in FIG. 1 so that the high bending stiffness of the release fingers 38 may be maintained.

Obviously many modifications and variations of the present invention are possible in light of the above. It is therefore, to be understood that within the scope of the appended claims, the invention may be practiced otherwise and as specifically described herein.

What is claimed is:

1. A clutch assembly comprising a flywheel secured to a drive shaft, a clutch cover secured to said flywheel, a diaphragm spring including an annular spring portion and a plurality of release fingers separated by slots having enlarged openings positioned at the outer ends of said slots, said diaphragm spring being pivotally mounted on the outer surface of said clutch cover by mounting means including a plurality of pivot rivets extending through said openings, an annular pressure plate disposed inside said clutch cover, a plurality of flexible drive straps interposed between said pressure plate and said clutch cover and extending chordally across said pressure plate, first securing rivet means securing one end of each drive strap to said pressure plate, second securing rivet means securing the other end of each drive strap to said clutch cover and positioned radially inwardly of the inner periphery of said pressure plate in alignment with said openings, and a driven disc interposed between said flywheel and said pressure plate and slidably splined on a driven shaft.

2. A clutch assembly as set forth in claim 1, wherein selected openings of said diaphragm spring are formed so as to allow the passage of a tool therethrough for riveting said second securing means.

3. A clutch assembly as set forth in claim 2, wherein the inner ends of the remaining openings are positioned radially outwardly further than the inner ends of said selected openings.

4. A clutch assembly as set forth in claim 1, wherein said clutch cover has axially inwardly drawn seat portions adapted to be connected with the other ends of said drive straps.

* * * * *